3,218,230
PESTICIDAL COMPOSITIONS AND METHODS

Edward D. Weil, Lewiston, N.Y., assignor to Hooker Chemical Corporation, Niagara Falls, N.Y., a corporation of New York
No Drawing. Original application Oct. 9, 1961, Ser. No. 143,539. Divided and this application Nov. 27, 1964, Ser. No. 414,468
3 Claims. (Cl. 167—33)

This is a division of my copending application S.N. 143,539, filed October 9, 1961.

This invention describes certain novel biocidal tricyclic sultones and methods for their use and preparation.

More particularly, this invention relates to hexahalo tri-unsaturated tricyclic sultones having utility as pesticides, particularly as fungicides and miticides, as pesticidal intermediates and as useful chemical intermediates generally. These compositions have the structure:

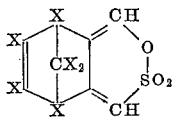

wherein X is a member of the group consisting of the halogens. The X substituents may be the same or different halogens.

The compounds having preferably all chlorine or all bromine substituted on the left hand bicyclic moiety are the preferred compositions of this invention because of ease of synthesis, the availability of starting materials and the cost of manufacture. For the sake of brevity, the hexachloro composition of this invention is referred to as $C_9H_2O_3Cl_6S$.

The hexahalo compositions of this invention are crystalline solids having sharp melting points. The hexachloro product is a colorless crystalline solid of M.P. 130 degrees centigrade. This chlorinated product is stable up to temperatures of about 230 degrees centigrade at which temperature it breaks down with evolution of $SO_2$. It is substantially insoluble in water and is soluble in most organic solvents including aromatic hydrocarbons such as xylene, chlorinated hydrocarbons, alcohols, ketones, esters, and ethers, and slightly soluble in alkanes.

As indicated above, the compositions of this invention exhibit pesticidal activity, and are particularly outstanding as fungicides. They also possess certain insecticidal activity such as toxicity toward mites and the like, and are active also against bacteria and marine fouling organisms. In addition, the compositions of this invention, their halogenation products, thermal decomposition products, hydrogenation products, adducts and products in which the sultone ring has been cleared or opened by nucleophilic reagents are useful as pesticides, as intermediates for preparing pesticides, or for organic synthesis generally.

In addition to their major advantages of biocidal activity and their availability as biocidal intermediates and chemical intermediates, this invention in its composition aspect offers other additional major advantages.

For example, these compositions due to their unique structure, stability and solubility in a variety of organic solvents lend themselves to formulation in diverse forms ranging from the simple to the complex. The invention compositions may be utilized as biocides, particularly as fungicides and miticides in the pure form or as reaction crudes. Where they are to be used as intermediates, the purified product is often both necessary and desirable.

The pesticidal preparations are conveniently made up as liquid or as solid formulations. Examples of solid formulations are dusts, wettable powders, granules and pellets. Each of these may contain one or more of the invention compositions combined with a solid carrier or extender, ordinarily a non-reacting or inert substance such as sand, clays, talcs, sawdust, flours, alkaline earth carbonates, oxides, phosphates, and the like as well as diatomaceous earths, micas and similar suitable materials.

Where liquid formulations are desirable, liquid extenders, diluents or carriers of a non-reactive nature are utilized. Examples of such materials are aliphatic alcohols, chlorocarbons, ketones and glycols, aromatic hydrocarbons, petroleum fractions and distillates among many others.

Where it is desired to use the aforementioned wettable powders, or liquid formulations either emulsified, dispersed or suspended in water or other fluid, one or more of a class of materials herein referred to as adjuvants may be incorporated into the powder, dust, or liquid formulation. These materials comprise surface active agents, detergents, wetting agents, solubilizing agents, stabilizers, dispersing agents, suspending agents, emulsifying agents, spreaders, stickers, and conditioning agents generally. These materials through their modifying characteristics facilitate handling and application, and not infrequently enhance or potentiate the compositions of this invention in their pesticidal activity by mechanisms frequently not well understood.

A satisfactory but not exhaustive list of these substances appears among other places in "Soap and Chemical Specialties," volume 31, No. 7, page 61; No. 8, pages 48–61; No. 9, pages 52–67, and No. 10, pages 38–67 (1955) Also, see Bulletin E–607 of the Bureau of Entomology and Plant Quarantine of the United States Department of Agriculture.

An additional advantage of the inventive compositions is their compatibility with a variety of biocidal materials. For example, it may frequently be convenient to combine one or more compositions of this invention with one or more adjuvants and carriers with insecticidal materials such as chlordane, benzene hexachlorides, DDT, DDD, the insecticidal carbamates, polychlorinated terpenes, the parathions, methoxychlor, insecticidal phosphates, phosphorothioates, and phosphorodithioates, with other fungicides such as sulfur, quinones, dodecylguanidine, the metal dimethyldithiocarbamates, N-trihalomethylthio-4-cyclohexene-1,2-dicarboximide, N-(trichloromethylthio) phthalimide, heptadecylimidazoline, dinitrocapryl crotonate and various fungicidal zinc, iron, nickel, manganese, copper, lead and mercury salts.

In its process aspects, the present invention offers several other advantages in addition to making available a source of biocidally active materials. For example, these processes offer two separate and distinct novel routes to the synthesis of the cyclic dienic six-membered ring sultones of this invention. Heretofore, only one prior art process was available to prepare six-membered dienic sultone rings. For example, the structure

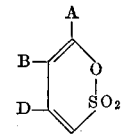

where A, B, D and E (which may be the same or different) are selected from the group consisting of hydrogen and alkyl, have been prepared hitherto only by the reaction of unsaturated ketones with sulfuric acid in the presence of acetic anhydride. However, the prior art process would appear to be limited to the preparation of those sultones having an alkyl group on the carbon atom adjacent to the ring oxygen. Furthermore, the prior art process is severely limited in commercial applicability by the general commercial unavailability of $\alpha,\beta$- or $\beta,\gamma$-unsaturated ketones, with only a few exceptions. Another shortcoming of the prior art process is the necessity of employing acetic anhydride, which adds expense without adding any moiety to the end product.

Specifically in regard to the present inventive compounds, the prior art process is inapplicable because of all of these factors.

Unexpectedly, it has been discovered that six-membered dienic sultone rings can be prepared by a number of novel and distinct, but related, processes.

The new processes of the invention comprise the reaction of at least one compound of the group consisting of compounds of the formula

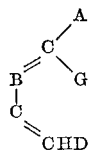

and compounds of the formula

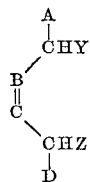

where A, B, C and D (which may be the same or different) are selected from the group consisting of hydrogen, halogen and alkyl (and where two or more are alkyl, said alkyls being optionally conjoined to form a ring), where G is selected from the group consisting of hydrogen and halogen, and where Y and Z (which may be the same or different) are chosen from the group consisting of halogen, hydroxy, and acyloxy, said compound being reacted with a reagent chosen from the group consisting of concentrated sulfur acid, oleum, and sulfuric anhydride, said reaction being conducted by admixture at about —20 to 150 degrees centigrade.

The present invention consists in its process aspect of the reaction of at least one compound chosen from the group described by the general formula

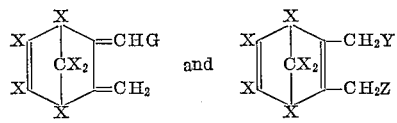

where X, G, Y and Z are as defined above, with a reagent chosen from the group consisting of substantially anhydrous $H_2SO_4$, oleum, and sulfuric anhydride. The preferred embodiment is where X equals chlorine and G equals hydrogen or chlorine, and where Y and Z are chosen from the group consisting of chlorine, hydroxy, and acetoxy, and where the other reagent is oleum.

Thus, for example, suitable reactants are:

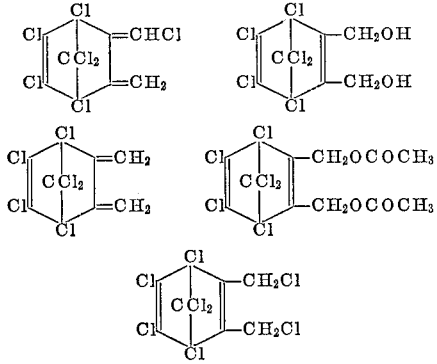

The above being preferred because of greater commercial availability, however, the following examples are also usable.

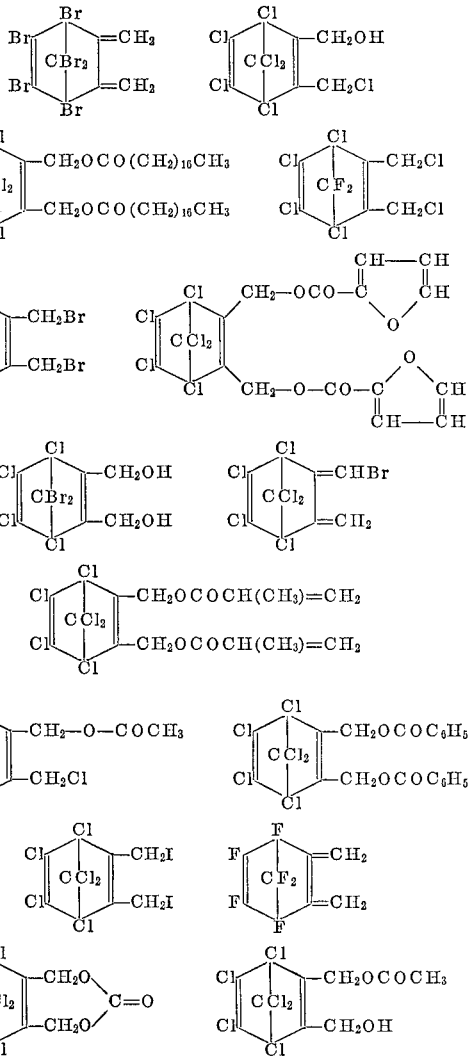

In regard to the sulfur-containing reagent, oleum (i.e. sulfuric acid containing free $SO_3$) is preferred. Also usable are sulfuric acid, sulfuric acid plus a dehydration agent such as $P_2O_5$, or sulfuric anhydride, or complexes of sulfuric anhydride with various Lewis bases such as dioxane, ethyl ether, pyridine, or the like.

The above reactions are carried out in the liquid phase by admixing one or more of the reactants with the sulfonating reagent present in molar excess at temperatures ranging from about —20 degrees centigrade to +150 degrees centigrade, preferable zero degrees centigrade to 120 degrees centigrade. The reaction is operable though sluggish at the lower temperature range while at temperatures toward 150 degrees centigrade and above there is some tendency for undesired and competing side reactions including sulfonation and/or oxidation of the product. The precise optimum operating temperature is largely dependent upon the reactivity of the particular aliphatic reactant used. The time will normally be a few minutes to several hours. Isolation of the sultone product may be made through a variety of means including precipitating the product through adding the reaction mixture to water, or by extraction with a sulfuric acid-stable organic solvent, followed by evaporation and crystallization, or by freezing the crystals out. A most convenient isolation procedure is dilution with water, followed by filtration of the crude product or extraction of the precipitated crude product by means of a solvent.

In respect to pesticidal use, the preferred method of employing the novel sultones of this invention is to apply the compounds or a formulation thereof to the site of the crop to be protected or to the soil, seeds, roots, foliage, branches or fruit. While the precise rates of application depend upon the type and degree of infestation and the tolerance of the plant and the part of the plant treated, rates of from 0.1 to 10 pounds per acre will generally be suitable in foliar application, lower rates in seed application down to 1 ounce per acre, with higher rates, up to and above 100 pounds per acre in soil application. While the emphasis in this application has been primarily that of fungicidal treatment of plants, the compounds of this invention used serve equally well as an antimicrobial agent in wood, paper, cloth, leather, stored food products, pulp, plastics and other substances suitable to deterioration due to microorganisms, and will generally be used at 0.1 p.p.m. or higher, in the medium to be treated. The compounds also have utility in paints, varnishes, and other coatings for prevention of attack by fungi, mildew, marine fouling organisms, and the like.

The following additional examples are submitted to more clearly illustrate the workings of this invention. Except as indicated in the claims, none of the submitted exemplification is to be construed as limitations of this invention in its composition and process aspects.

*Example 1.—Preparation of $C_9H_2O_3Cl_6S$ sultone from 1,4,5,6,7,7-hexachloro-2,3-bis(chloromethyl)bicyclo(2.-2.1)-heptadiene-2,5*

A mixture of 20 parts of 1,2,3,4,7,7-hexachloro-5,6-bis-(chloromethyl)bicyclo(2.2.1)-heptadiene-2,5 (prepared as in United States Patent 2,951,098) and 75 parts of oleum (20% $SO_3$ content) is warmed at 75 degrees centigrade for one-half hour. The resultant clear solution is poured with agitation into water at zero to 10 degrees centigrade (approximately 1000 parts). The precipitated solid is removed by filtration and, after washing with water to remove adhering acid, and drying, the solid is recrystallized from hot heptene to obtain 18 parts of colorless crystalline solid, melting point 130 degrees centigrade.

*Analysis.*—Calcd. for $C_9H_2O_3Cl_6S$: C, 26.9; H, 0.50; Cl, 52.9; S, 7.94. Found: C, 26.84; H, 0.55; Cl, 52.8; S, 7.99.

The infrared spectrum provides evidence for the —O—$SO_2$— group as well as two vinylic hydrogen-to-carbon bonds (=CH— structures) Molecular weight calcd. 405; found (ebullioscopic in benzene), 388 ($\pm 10\%$).

*Example 2.—Preparation of $C_9H_2O_3Cl_6S$ sultone from 1,4,5,6,7,7-hexachloro-2,3 - bis(methylene)bicyclo(2.2.-1)-heptene-5*

A mixture of 10 parts of 1,4,5,6,7,7-hexachloro-2,3-bis-(methylene)bicyclo(2.2.1)-heptene-5 (J. Am. Chem. Soc. 81, 5415) and 75 parts of oleum (20% $SO_3$) is mixed, and spontaneously heated to 40 to 50 degrees centigrade. After 30 minutes, the product is isolated and recrystallized as in Example 1, to obtain 5 parts of colorless product, melting point 130 degrees centigrade, which by its infrared spectrum is identified to be the same as the product of Example 1.

*Example 3.—Preparation of $C_9H_2O_3Cl_6S$ sultone from 1,4,5,6,7,7-hexachloro-2,3 - bis(hydroxymethyl)bicyclo-(2.2.1)-heptadiene-2,5*

A mixture of 10 parts of 1,4,5,6,7,7-hexachloro-2,3-bis-(hydroxymethyl)bicyclo(2.2.1)-heptadiene-2,5 (J. Am. Chem. Soc. 81, 5416) and 75 parts of oleum (20% $SO_3$) are stirred together, causing an exotherm to 50 degrees centigrade. After 3 hours, the product is isolated and recrystallized as in Example 1, to obtain 5 parts of a product which is the same as in the above examples, by melting point and infrared spectrum.

*Example 4.—Preparation of $C_9H_2O_3Cl_6S$ sultone from 1,4,5,6,7,7-hexachloro-2,3 - bis(acetoxymethyl)bicyclo-(2.2.1)-heptadiene-2,5*

A mixture of 100 parts of 1,4,5,6,7,7-hexachloro-2,3-bis(acetoxymethyl)bicyclo(2.2.1)-heptadiene-2,5 (J. Am. Chem. Soc. 81, 5416) and 500 parts of oleum (20% $SO_3$) is heated for 5 hours at 70 degrees centigrade and the product isolated as above and found to be the same compound $C_9H_2O_3Cl_6S$ by infrared spectrum and melting point. By stopping the reaction after a one-hour period, 1,4,5,6,7,7-hexachloro-2 hydroxymethyl-3-acetoxymethyl-bicyclo(2.2.1)-heptadiene is isolated and characterized by infrared spectrum, indicating this to be a reaction intermediate capable of yielding the sultone by further reaction with oleum.

*Example 5.—Preparation of $C_9H_2O_3Cl_6S$ sultone from hexachloro-2-methylene - 3 - (chloromethylene)-bicyclo (2.2.1)heptene-5*

A mixture of 5 parts of 1,4,5,6,7,7-hexachloro-2-methylene-3-(chloromethylene)-bicyclo(2.2.1)-heptene-5 (prepared by dehydrochlorination of 1,4,5,6,7,7-hexachloro-2,3 - bis(chloromethyl)bicyclo(2.2.1) - heptadiene-2,5 by KOH in $CH_3OH$ at reflux) plus 12.5 parts of oleum (20% $SO_3$) was heated for 30 minutes at 80 degrees centigrade, then the product isolated and purified as in Example 1, giving a nearly quantitative yield of the sultone $C_9H_2O_3Cl_6S$, identical in melting point and infrared spectrum to that made in Example 1.

*Example 6.—Use of 65% oleum*

Twenty parts of 1,4,5,6,7,7-hexachloro-2,3-bis(chloromethyl)bicyclo(2.2.1)-heptadiene and 80 parts of oleum (65% $SO_3$) were mixed at room temperature, causing an exotherm to 60 degrees centigrade. When the exotherm subsided, the solution was poured slowly into water, and the product isolated by extraction using chloroform, the chloroform evaporated, and the crude product purified as in the preceding examples, to obtain 12 parts of the sultone $C_9H_2Cl_6SO_3$, identified by melting point and infrared spectrum.

*Example 7.—Use of sulfuric anhydride*

Twenty parts of 1,4,5,6,7,7-hexachloro-2,3-bis(chloromethyl)bicyclo(2.2.1)-heptadiene-2,5 was dissolved in 75 parts of liquid sulfur trioxide (commercial "stabilized Sulfan"), with cooling to hold the temperature below 50 degrees centigrade. After 10 minutes, the solution was cautiously added to crushed ice, and the product extracted from the aqueous-organic mixture by means of chloroform. On evaporation of the chloroform, a syrup was obtained which, on dissolving in heptane and chilling the resultant solution, yielded 7 parts of the crystalline sultone $C_9H_2Cl_6SO_3$, identified by infrared spectrum and melting point.

*Example 8.—Use of sulfuric acid*

Three parts of 1,4,5,6,7,7-hexachloro-2-methylene-3-(chloromethylene)bicyclo(2.2.1)-heptene-5 and thirty-five parts of essentially pure sulfuric acid (made by adding sulfuric anhydride in an amount equivalent to the water present in technical ninety-six percent sulfuric acid), are heated at seventy degrees for one hour, then poured into water. The precipitated solids are filtered off and found to be the sultone $C_9H_2O_3Cl_6S$ by infrared analysis.

*Example 9.—Emulsifiable formulation*

An emulsifiable formulation of the compound $$C_9H_2O_3Cl_6S$$

(prepared as above) is made by blending the following ingredients:

| | Parts |
|---|---|
| $C_9H_2O_3Cl_6S$ | 1.0 |
| Emcol 500X (commercial polyoxyethylenesulfonate emulsifier) | 0.3 |
| Emcol 300X (commercial polyoxyethylenesulfonate emulsifier) | 0.3 |
| Xylene | 6.4 |
| Isophorone | 2.0 |

This formulation is emulsified with water prior to spraying.

Example 10.—Dust formulation

A dust formulation of $C_9H_2O_3Cl_6S$ is made by grinding together the following:

| | Parts |
|---|---|
| Attapulgus clay | 95 |
| $C_9H_2O_3Cl_6S$ | 5 |

This formulation is applied to crops from a dusting apparatus.

Example 11.—Wettable powder

A wettable powder formulation of $C_9H_2O_3Cl_6S$ is made by grinding together the following materials:

| | Part |
|---|---|
| $C_9H_2O_3Cl_6S$ | 1 |
| Microcel E (synthetic silicate) | 0.90 |
| Marasperse N (lignin sulfonate dispersant) | 0.05 |
| Sorbit P (alkylarylsulfonate wetting agent) | 0.05 |

This formulation is dispersed in water prior to spraying.

Example 12.—Fungicidal use

Twenty tomato plants infested with spores of *Alternaria solani* (early blight disease) are sprayed with wettable powder dispersions of $C_9H_2O_3Cl_6S$ (as prepared above). Twenty infested plants are left unsprayed. Two weeks later when the untreated plants had developed numerous leaf lesions due to the disease, the lesions on the sprayed plants were counted and the percent repression of leaf lesions relative to the unsprayed controls was calculated (as "percent control"). The results are as follows:

| Concentration of $C_9H_2O_3Cl_6S$: | Percent control |
|---|---|
| 100 p.p.m. | 100 |
| 50 p.p.m. | 100 |
| 25 p.p.m. | 98 |
| 12.5 p.p.m. | 80 |

Example 13.—Fungicidal use

Similar tests to the above were run using tomato plants infested with *Phytophthora infestans*, the causative organism of late blight disease. The following percentages of control were observed:

| Concentration of $C_9H_2O_3Cl_6S$: | Percent control |
|---|---|
| 100 p.p.m. | 100 |
| 50 p.p.m. | 99 |
| 25 p.p.m. | 94 |

Example 14.—Fungicidal use

Spore germination tests are carried out by the standard method of the American Phytopathological Society, employing *Alternaria oleracia* and *Monolinia fructicola* as test organisms. Maneb (manganous ethylenebis(dithiocarbamate)), a highly effective commercial fungicide, was tested for comparison. The results are as follows:

| Compound | Fungus | Percent Germination of Spores at Concentrations (p.p.m.) Indicated | | | | | | | |
|---|---|---|---|---|---|---|---|---|---|
| | | 100 | 10 | 1 | 0.3 | 0.1 | 0.03 | 0.01 | 0 |
| $C_9H_2O_3Cl_6S$ | A.o. | 0 | 0 | 11 | 59 | 82 | 100 | 100 | 100 |
| $C_9H_2O_3Cl_6S$ | M.f. | 0 | 0 | 2 | 36 | 42 | 68 | 100 | 100 |
| Maneb | A.o. | 0 | 0 | 72 | 100 | 100 | 100 | 100 | 100 |
| Maneb | M.f. | 0 | 0 | 100 | 100 | 100 | 100 | 100 | 100 |

Example 15.—Miticidal activity

Bean plants are sprayed with an aqueous emulsion containing 0.1 percent of $C_9H_2O_3Cl_6S$ sultone, and then infested with *Tetranychus atlanticus* mites. Unsprayed control plants are similarly infested. After 5 days, substantially 100 percent kill of mites on the treated plants was observed.

What is claimed is:

1. A pesticidal composition comprising as a principal active ingredient a pesticidal amount of a compound of the structure:

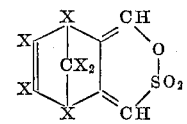

wherein X is halogen plus at least one adjuvant chosen from the group consisting of a solvent, a surface-active agent, an emulsifying agent, a dispersing agent, a solid carrier and a liquid carrier.

2. A method of controlling microorganisms comprising the application of a fungicidal amount of a compound of the structure:

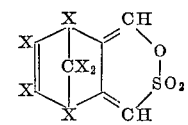

wherein X is halogen, to the locus of the microorganism to be treated.

3. A method of controlling mites comprising the application to the mites of a miticidal amount of a compound of the structure:

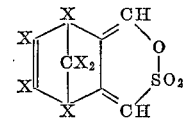

wherein X is halogen.

References Cited by the Examiner

UNITED STATES PATENTS

| | | | |
|---|---|---|---|
| 2,861,919 | 11/1958 | Gilbert | 167—33 |
| 2,900,393 | 8/1959 | Broderick | 260—327 |
| 2,958,624 | 11/1960 | Bimber | 167—33 |
| 2,983,732 | 5/1961 | Geering et al. | 260—327 |
| 3,078,277 | 2/1963 | Geering | 260—327 |

OTHER REFERENCES

Mustafa: Chem. Reviews, vol. 54, #2, pages 195–197 (1954).

JULIAN S. LEVITT, *Primary Examiner.*